United States Patent
Ellerich

(10) Patent No.: US 8,622,363 B2
(45) Date of Patent: Jan. 7, 2014

(54) VEHICLE SEAT

(75) Inventor: Frank Ellerich, Bennhausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 109 days.

(21) Appl. No.: 13/111,456

(22) Filed: May 19, 2011

(65) Prior Publication Data
US 2011/0284713 A1    Nov. 24, 2011

(30) Foreign Application Priority Data

May 20, 2010   (DE) .......................... 10 2010 021 481

(51) Int. Cl.
*F16M 13/00*    (2006.01)

(52) U.S. Cl.
USPC .................. 248/421; 297/344.16; 297/344.15; 248/431; 248/164; 248/588; 248/584; 248/585

(58) Field of Classification Search
USPC ......... 248/421, 147, 164, 584, 585, 431, 588, 248/274.1; 297/344.15, 344.16, 344.13, 297/344.17; 254/122; 296/65.01
See application file for complete search history.

(56) References Cited

U.S. PATENT DOCUMENTS

| | | | | |
|---|---|---|---|---|
| 6,974,123 B2 * | 12/2005 | Latvys | ........................... | 254/122 |
| 7,044,553 B2 * | 5/2006 | Ropp | ........................ | 297/344.15 |
| 7,338,126 B2 * | 3/2008 | Ropp | ........................ | 297/344.15 |
| 7,712,836 B2 * | 5/2010 | Deml | ........................ | 297/344.16 |
| 8,191,865 B2 * | 6/2012 | Polins et al. | .................. | 254/122 |

FOREIGN PATENT DOCUMENTS

| | | |
|---|---|---|
| CN | 1205952 | 1/1999 |
| CN | 101342880 | 1/2009 |
| CN | 101524978 | 9/2009 |
| DE | 4041573 | 7/1992 |
| DE | 102008015614 | 7/2009 |
| EP | 0893289 | 1/1999 |
| JP | 2005096746 | 4/2005 |

* cited by examiner

*Primary Examiner* — Todd M. Epps
(74) *Attorney, Agent, or Firm* — Cozen O'Connor

(57) ABSTRACT

A vehicle seat having an oscillatory scissor-type stand and a damper that is articulated at two parts of the scissor-type stand which are movable relative to one another. One end of the damper is articulated at a pin that extends in transverse direction of the seat and extends between two structural parts arranged at a distance from one another in transverse direction of the seat at a part of the scissor-type stand. A bearing bushing is arranged with its axial bushing opening on a tubular component part enclosing the pin, wherein the bushing opening has a spherical longitudinal section with the greatest diameters at the two axial ends and the smallest diameter in the middle of the bushing opening. The bearing bushing is enclosed by a bearing ring of the damper having a shorter axial length than the bearing bushing and is arranged on the bearing bushing at an axial distance from the two ends of the bearing bushing so as to be secured against axial displacement. The bearing bushing is arranged between the structural parts without axial play.

14 Claims, 5 Drawing Sheets

VEHICLE SEAT

BACKGROUND OF THE INVENTION

1. Field of the Invention

The invention is directed to a vehicle seat, particularly a seat in a commercial vehicle, having an oscillatory scissor-type stand and a damper articulated at two parts of the scissor-type stand movable relative to one another, wherein one end of the damper is articulated at a pin that extends in transverse direction of the seat and that extends between two structural parts arranged at a distance from one another in transverse direction of the seat at a part of the scissor-type stand.

2. Description of the Related Art

In a vehicle seat of the type mentioned above, the seat structure may be exposed to torsion so that the point of connection of the damper to the pin in particular can shift slightly in y-direction. If the damper is fixedly clamped in at such a time, it can tilt and be damaged.

In order to prevent this, the damper can be mounted on an articulated bushing or on a bushing constructed so as to be spherical on the inner side. In this case, a slight rotation perpendicular to the y-axis is possible in order to compensate for a twisting of the seat structure. In this case, the damper may move in y-direction and contact the structural parts.

DE 10 2008 015 614 B3 discloses a commercial-vehicle seat of the type mentioned above having a damper arranged at a scissor pin of the commercial-vehicle seat by means of a ball joint.

Arrangements of dampers or similarly operating component parts between movable parts are also common in other technical fields. For example, EP 0 893 289 A1 discloses a hydraulic cylinder arranged between a vehicle frame and a steerable rear axle of a forklift. For this purpose, the hydraulic cylinder is mounted on a bushing with a convex surface.

This can lead to unpleasant noises.

SUMMARY OF THE INVENTION

It is an object of one embodiment of the invention to provide a vehicle seat of the type mentioned above that avoids these drawbacks, has a simple construction, and is easy to assemble.

According to one embodiment of the invention, a bearing bushing is arranged with its axial bushing opening on a pin or on a tubular component part enclosing the pin. The bushing opening has a spherical longitudinal section with the greatest diameters at the two axial ends and the smallest diameter in the middle region of the bushing opening, in that the bearing bushing is enclosed by a bearing ring of the damper having a shorter axial length than the bearing bushing, the bearing ring is arranged on the bearing bushing at an axial distance from the two ends of the bearing bushing so as to be secured against axial displacement, and the bearing bushing is arranged between the structural parts without axial play.

Owing to the spherical longitudinal section of the bushing opening, a slight rotation can be carried out relative to the y-axis without hindrance at the articulation point of the damper, and the damper is reliably prevented from contacting the structural parts and, therefore, from generating unpleasant noises in an axially fixed position of the bearing ring of the damper in a middle position between the structural parts due to the axial distance between the bearing ring and the structural parts.

The bearing bushing can be supported by its front end at the structural parts directly or by spacer elements so that the bearing bushing is arranged between the structural parts without play, and at least one front end of the bearing bushing is supported in an axially resilient manner.

For this purpose, the bearing bushing can have, at one front end, one or more spring arms directed radially outward and by which the bearing bushing is axially supported at a structural part.

To prevent tilting of the bearing bushing, the bearing bushing can have a plurality of spring arms arranged so as to be uniformly distributed around its circumference.

In order to have a long operative length of the spring arms and, therefore, a large possible spring deflection, the arms can comprise a first spring arm portion which is directed radially outward and a second spring arm portion extending axial to the longitudinal axis of the bearing bushing, the end of the second spring arm portion remote of the first spring arm portion being connected to the bearing bushing.

In this way, manufacturing tolerances in the bearing parts are reliably bypassed so that the bearing bushing is arranged without axial play.

The spring arms can be constructed integral with the bearing bushing to economize on components parts.

In order to axially define the installation position of the bearing ring in one axial direction, one or more stops can be fixedly arranged in the end region of the bearing bushing having the spring arms, which stops project radially outward from the radially circumferential cylindrical outer lateral surface of the bearing bushing, and one end face of the bearing ring contacts the stops axially, for which purpose the bearing bushing can have a plurality of stops which are arranged so as to be uniformly distributed over its circumference.

This also results in a construction that economizes on component parts when the stops are constructed integral with the bearing bushing.

A multifunction bearing bushing is achieved in such a way that component parts are spared when the bearing bushing has the spring arms and the stops alternately distributed over its circumference.

If a second stop that is contacted axially by the second end face of the bearing ring can be arranged at the end region of the bearing bushing opposite the stops, this serves to axially define the installation position of the bearing ring in the other axial direction.

In a simple construction for this purpose, the second stop can be a ring can be inserted into an annular groove formed radially circumferentially at the cylindrical outer lateral surface of the bearing bushing, and the ring is preferably a flexible retaining ring.

The tubular component part enclosed by the bearing bushing can have at its one axial end a first spacer element that projects radially outward by which the bearing bushing is supported by one front end or by the spring arms at one of the structural parts.

To economize on component parts, the spacer element can be a flange.

A cap-shaped second spacer element can be placed on the second axial end of the tubular component part enclosed by the bearing bushing, the bearing bushing is axially supported at the front side of the radially circumferential cap edge of the second spacer element, and the cap base of the second spacer element is supported at the second structural part.

In a simple construction, the pin is preferably a screw whose shaft projects through a first axial bore hole in the first structural part, the bushing opening, and a second axial bore hole in the second structural part, and one end of the screw shaft has a screw head which contacts the outer side of one structural part, and the other end of the screw shaft is provided with a thread on which a nut is screwed which contacts the outer side of the other structural part.

The pin is preferably a screw whose screw shaft projects through a first axial bore hole in the first structural part, the tubular component part, a bore hole in the cap base, and a second axial bore hole in the second structural part, one end of the screw shaft has a screw head which contacts the outer side of one structural part, and the other end of the screw shaft is provided with a thread on which is screwed a nut contacting the outer side of the other structural part.

The tubular component part is clamped in between the two structural parts by the firmly tightened nut without play and without impairing the ability of the bearing bushing to swivel freely around the y-axis.

In a simple construction, the damper is a gas spring.

Oscillation, e.g., in z-direction, is made possible in that the scissor-type stand has two pairs of rocker arms arranged at a distance from one another in the transverse direction of the seat, each of which comprises two crossed rocker arms, and the rocker arms of the pair of rocker arms and the two pairs of rocker arms are supported so as to be swivelable around a common scissor axis extending in the transverse direction of the seat.

Arranging the damper in the middle between the pairs of rocker arms in transverse direction of the seat results in a substantially homogeneous loading. Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment example of the invention is shown in the drawings and is described more fully in the following. In the drawings.

DETAILED DESCRIPTION OF THE PRESENTLY PREFERRED EMBODIMENTS

Figure 1:
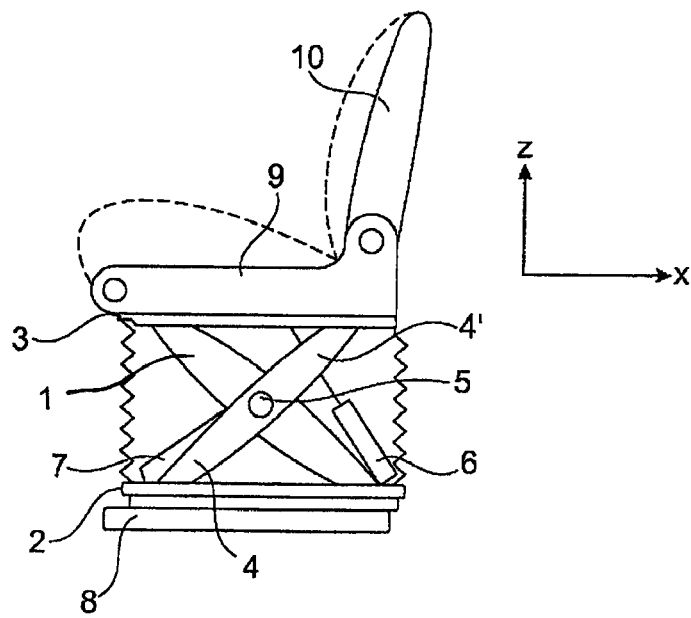
FIG. 1 is a side view of a vehicle seat.

The vehicle seat shown in FIG. 1 has a scissor-type stand 1 having a lower frame 2, an upper frame 3 arranged above the lower frame 2, and, on both sides, a pair of rocker arms each comprising two crossed rocker arms 4, 4'.

A scissor pin 5 extending in transverse direction y of the seat connects the two crossing points of the pair of rocker arms 4, 4' and at the same time defines the axis around which the rocker arms 4, 4' can be swiveled relative to one another.

The rocker arms 4, 4' are each articulated at their rear end at the lower frame 2 or at the upper frame 3 and have, at their front end, rotatable rollers by which they are guided in or at the upper frame 3 or lower frame 2 so as to be movable in the longitudinal direction x of the seat.

The height of the upper frame 3 above the lower frame 2 is changed by this movement of the rocker arms 4, 4'.

By a spring 6 and a damper 7, the scissor-type stand 1 becomes an oscillating system which enhances sitting comfort.

The oscillating direction which ideally corresponds to the vertical direction and is designated by z.

The scissor-type stand 1 is displaceable in the longitudinal direction x of the seat by seat rails 8 so that the vehicle seat is longitudinally adjustable.

The vehicle seat further has a seat frame 9 which is articulated on both sides at the upper frame 3 in transverse direction y of the seat in its rear area on the one hand and can be raised and lowered at its front area by a tilt adjuster on the other hand and is therefore adjustable with respect to its inclination relative to the scissor-type stand 1.

Further, the vehicle seat has a backrest 10 arranged at the seat frame 9.

Figure 3:
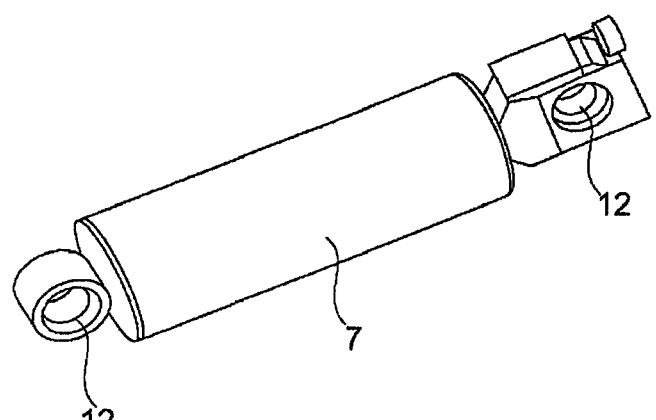
FIG. 3 is a perspective view of a damper of the vehicle seat according to FIG. 1.

As shown in FIG. 3, at each end, the damper 7 has a bearing ring 12 by which the damper 7 is articulated at the seat frame 9.

The damper 7 is arranged in the middle between the two pairs of rocker arms with respect to the transverse direction y of the seat so that it acts symmetrically on the rocker arms 4, 4' of the scissor-type stand 1.

Figure 2:
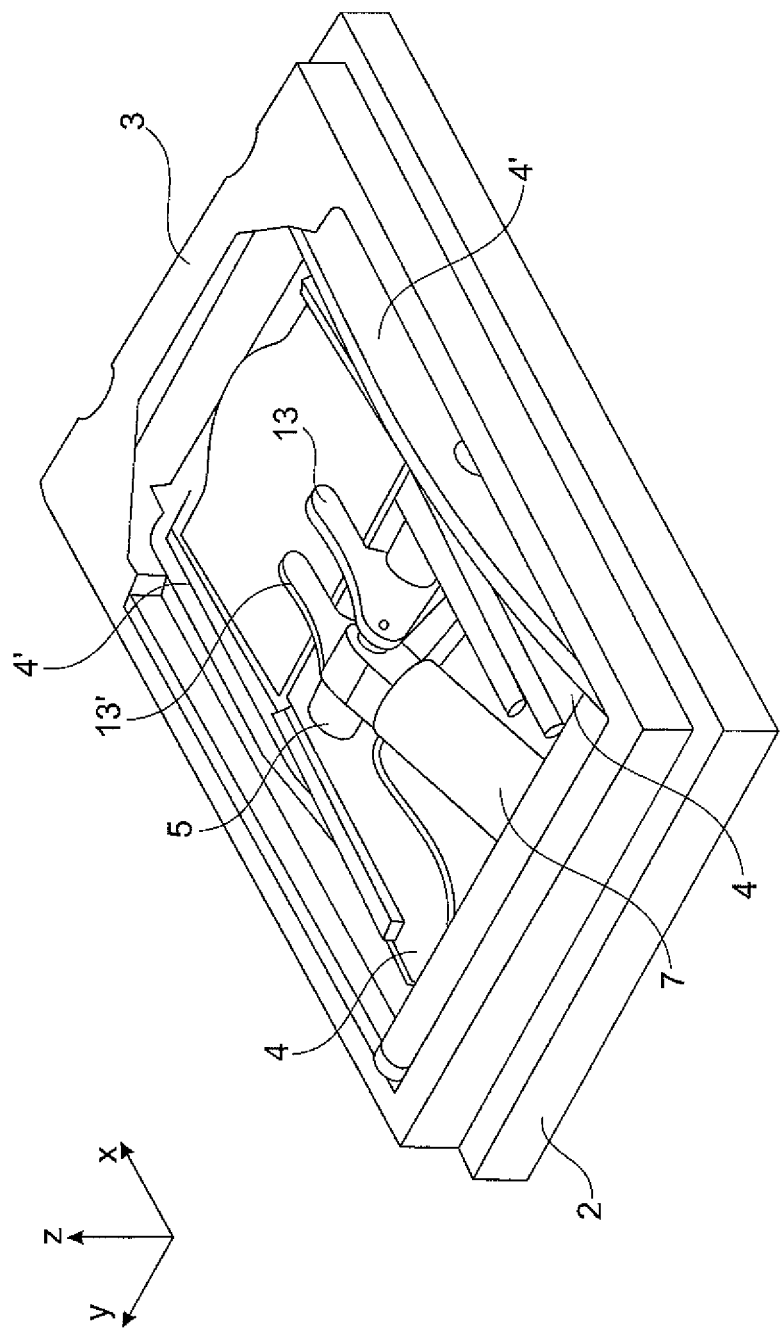
FIG. 2 is a perspective view of a scissor-type stand of the vehicle seat according to FIG. 1.
Figure 4:
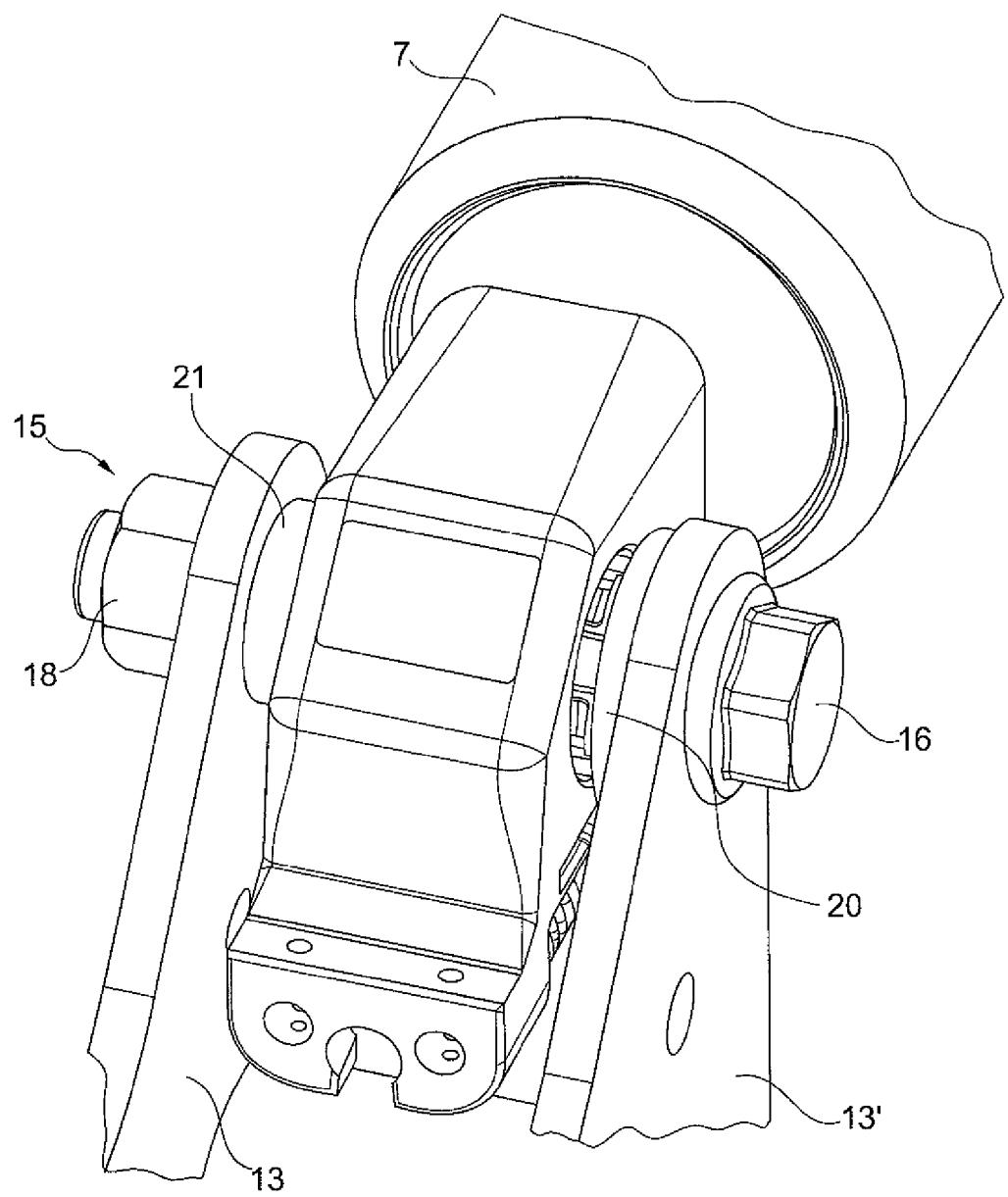
FIG. 4 is an enlarged perspective view of the bearing area of the scissor-type stand according to FIG. 2.

One end of the damper 7 is articulated at two structural parts 13, 13' which are arranged at a distance from one another in transverse direction y of the seat and are fastened to the scissor pin 5. (FIG. 2).

Figure 5:
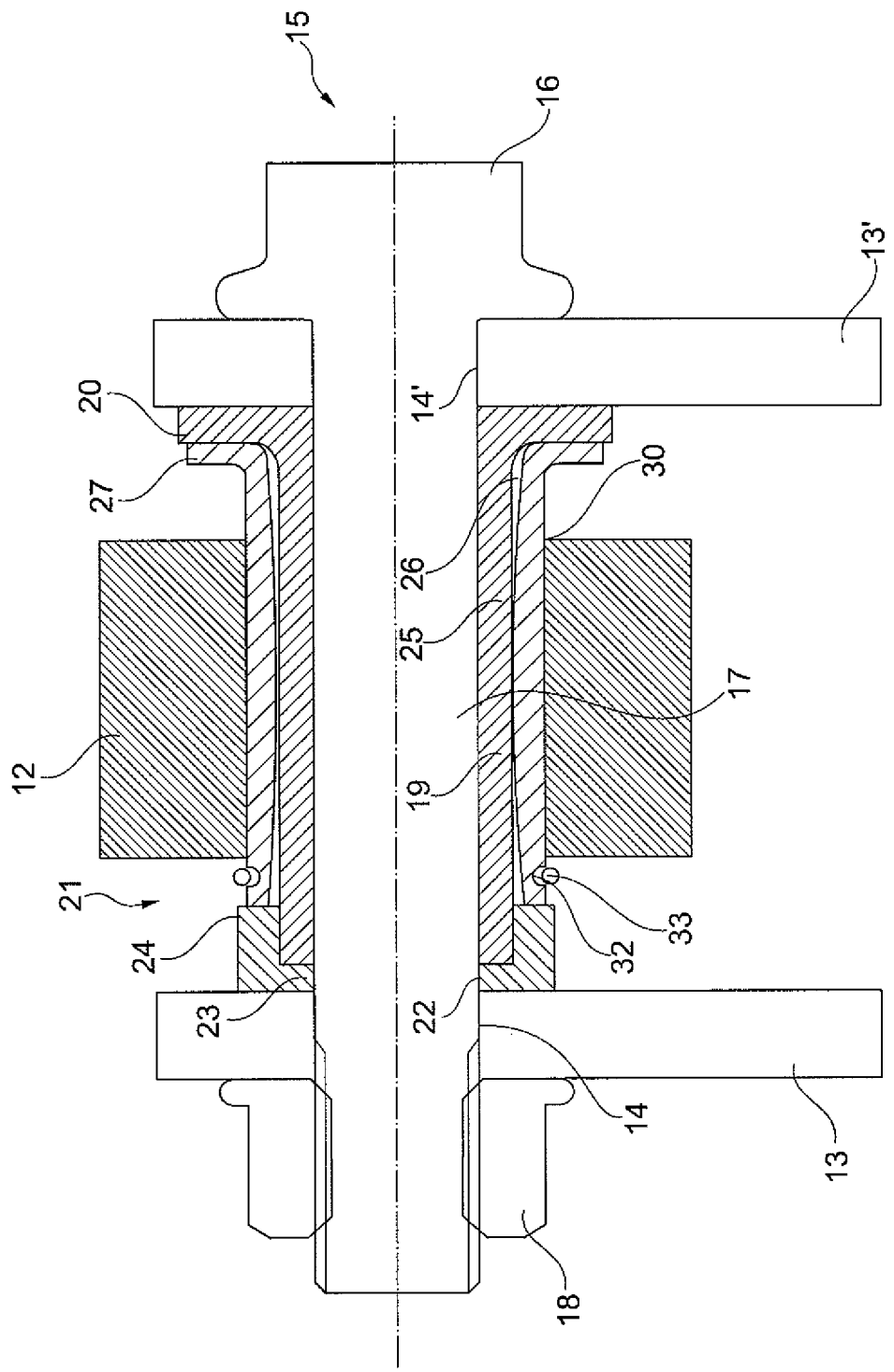
FIG. 5 is a longitudinal section of the bearing area according to FIG. 4.

The structural parts 13, 13' have first and second axial bore holes 14, 14' which are formed coaxial to one another in transverse direction y of the seat and through which projects a screw 15 serving as an axis. (FIG. 5).

The screw head 16 of the screw 15 contacts the outer side of the structural part 13, while a nut 18 is screwed on to the thread at the other end of the screw shaft 17 of the screw 15 and contacts the outer side of the structural part 13'. (FIG. 5).

The region of the screw shaft 17 forming the axis between the structural parts 13, 13' is enclosed by a tubular component part 19 which has a flange 20 at one axial end and is supported by the latter at the inner wall of the structural part 13.

The region of the screw shaft 17 forming the axis is further enclosed by a cap-like spacer element 21, and the screw shaft 17 projects through a bore hole 22 in the cap base 23. (FIG. 5).

The radially circumferential cap edge 24 of the spacer element 21 engages over the end of the tubular component part 19 remote of the flange 20. The front side of the end of the tubular component part 19 over which the cap edge 24 engages contacts the inner side of the cap base 23 whose outer side in turn contacts the inner side of the structural part 13'. (FIG. 5).

The tubular component part 19 and the spacer element 21 are clamped between the two structural parts 13, 13' without play by the screw 15.

Figure 6:
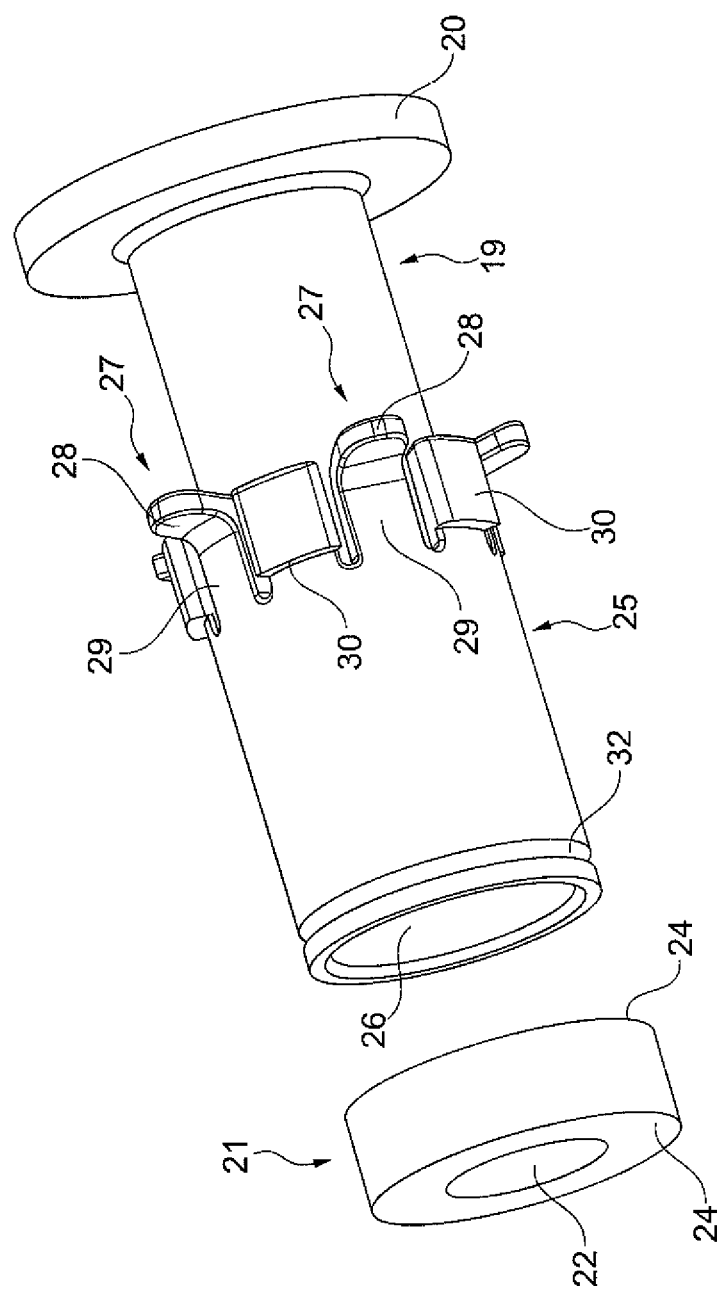
FIG. 6 is a perspective telescopic view of an assembly comprising bearing bushing, tubular component part, and second spacer element of the bearing area according to FIG. 5.

A bearing bushing 25 is arranged on the tubular component part. (FIG. 6).

The bushing opening 26 of the bearing bushing 25 has a spherical longitudinal section with the greatest diameters at the two axial ends and the smallest diameter in the middle region of the bushing opening 26. The diameter in the middle region of the bushing opening 26 corresponds to the outer diameter of the tubular component part 19.

At its front end, the bearing bushing 25 has a plurality of spring arms 27 that are uniformly distributed around its circumference and are directed radially outward. By these spring arms 27, the bearing bushing 25 is supported axially at the flange 20 of the tubular component part 19 and this flange 20 is in turn supported at one structural part 13.

For this purpose, the spring arms 27 comprise a first spring arm portion 28 that is directed radially outward and a second spring arm portion 29 that extends axial to the longitudinal axis of the bearing bushing 25.

The bearing bushing 25 is arranged between the flange 20 and the cap edge 24 by its front ends and the spring arms 27 so as to be free from play. (FIG. 5).

The bearing bushing 25 has stops 30 which are uniformly distributed over the circumference alternately with the spring arms 27 and which project radially outward from the cylindrical outer lateral surface 21 of the bearing bushing 25. (FIG. 6).

An annular groove 32 that extends radially circumferentially around the cylindrical lateral surface 31 is formed at the end region of the bearing bushing 25 opposite the stops 30, a flexible retaining ring 33 being inserted into this annular groove 32. (FIG. 5).

The bearing ring 12 of the damper 7 is arranged on the bearing bushing 25 so as to encompass the outer lateral surface of the bearing bushing 25 and is secured in its middle installation position by the stops 30 and the retaining ring 33 so as to prevent axial displacement.

In the same way, the damper 7 is arranged with its other end on another bearing bushing and is articulated at two structural parts, not shown.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A vehicle seat, comprising:
an oscillatory scissor-type stand having two pairs of rocker arms arranged at a distance from one another;
a pair of structural parts coupled to one or more of the rocker arms;
a pin extending between the pair of structural parts;
a damper articulated at two parts of the scissor-type stand, the two parts being movable relative to one another, wherein one end of the damper is articulated at the pin;
a bearing bushing between the pair of structural parts, the bearing bushing having an axial bushing opening on one of the pin and a tubular component part enclosing the pin, the bushing opening having a spherical longitudinal section with greatest diameters at axial ends of the bushing opening and a smallest diameter between the axial ends of the bushing opening; and
a bearing ring of the damper arranged between the structural parts without axial play and configured to enclose the bearing bushing by having a shorter axial length than the bearing bushing, the bearing ring arranged on the bearing bushing at an axial distance from the two ends of the bearing bushing so as to be secured against axial displacement.

2. The vehicle seat according to claim 1, wherein the bearing bushing is supported at a front end by the structural parts one of directly and by spacer elements, wherein at least one of the front ends of the bearing bushing is supported in an axially resilient manner.

3. The vehicle seat according to claim 2, wherein the bearing bushing has at the one front end one or more spring arms that are directed radially outward and by which the bearing bushing is axially supported by one of the structural parts.

4. The vehicle seat according to claim 3, wherein the spring arms comprise a first spring arm portion directed radially outward and a second spring arm portion extending axial to the longitudinal axis of the bearing bushing,
wherein the end of the second spring arm portion remote of the first spring arm portion is connected to the bearing bushing.

5. The vehicle seat according to claim 3, wherein the tubular component part has at one axial end a first spacer element that projects radially outward, and
the bearing bushing is supported by one of the one front end and by the spring arms at one of the structural parts, by the first spacer element.

6. The vehicle seat according to claim 2, further comprising a cap-shaped second spacer element arranged on a second axial end of the tubular component part,
wherein the bearing bushing is axially supported at the front side of the radially circumferential cap edge of the second spacer element, and the second spacer element is supported at the second structural part by its cap base.

7. The vehicle seat according to claim 2, wherein each of the pair of structural parts is fastened to a support element coupling the two pairs of rocker arms.

8. The vehicle seat according to claim 7, wherein the support element is arranged at a crossing point of each pair of rocker arms.

9. The vehicle seat according to claim 1, wherein one or more first stops are fixedly arranged in the end region of the bearing bushing having the spring arms, the one or more first stops project radially outward from the radially circumferential cylindrical outer lateral surface of the bearing bushing, and one end face of the bearing ring contacts the stops axially.

10. The vehicle seat according to claim 9, further comprising a second stop arranged at the end region of the bearing bushing opposite the one or more first stops, the bearing ring contacting the second stop axially by its second end face.

11. The vehicle seat according to claim 10, wherein the second stop is a ring insertable into an annular groove arranged radially circumferentially at a cylindrical outer lateral surface of the bearing bushing.

12. The vehicle seat according to claim 1, wherein the pin comprises a screw having a shaft projecting through a first axial bore hole in a first of the structural parts, and projecting through the tubular component part, a bore hole in the cap base, and a second axial bore hole in a second of the structural parts,
wherein, one end of the screw shaft has a screw head that contacts the outer side of the first structural part, and the other end of the screw shaft is provided with a thread, and a nut is screwed onto the thread, the nut contacting the outer side of the second structural part.

13. The vehicle seat according to claim 1, wherein the seat is a seat in a commercial vehicle.

14. The vehicle seat according to claim 7, wherein the smallest diameter of the spherical longitudinal section is in a middle region of the bushing opening.

* * * * *